(12) United States Patent
Vergentini et al.

(10) Patent No.: US 10,399,808 B2
(45) Date of Patent: Sep. 3, 2019

(54) LINE FOR THE PRODUCTION OF SPOOLS OF WEB MATERIAL

(71) Applicant: A.CELLI NONWOVENS S.P.A., Porcari (IT)

(72) Inventors: Francesco Vergentini, Pieve a Nievole (IT); Riccardo Paladini, Bagni di Lucca (IT)

(73) Assignee: A.CELLI NONWOVENS S.P.A., Porcari (LU) (IT)

( * ) Notice: Subject to any disclaimer, the term of this patent is extended or adjusted under 35 U.S.C. 154(b) by 0 days.

(21) Appl. No.: 15/591,743

(22) Filed: May 10, 2017

(65) Prior Publication Data

US 2017/0327336 A1 Nov. 16, 2017

(30) Foreign Application Priority Data

May 13, 2016 (IT) .......................... 102016000049154

(51) Int. Cl.
*B65H 19/12* (2006.01)
*B65H 19/30* (2006.01)
(Continued)

(52) U.S. Cl.
CPC .......... *B65H 19/12* (2013.01); *B25J 15/0047* (2013.01); *B65H 18/103* (2013.01); *B65H 19/123* (2013.01); *B65H 19/18* (2013.01); *B65H 2301/3251* (2013.01); *B65H 2301/364* (2013.01); *B65H 2301/46011* (2013.01); *B65H 2301/54* (2013.01); *B65H 2402/351* (2013.01);
(Continued)

(58) Field of Classification Search
CPC .................. B65H 19/12; B65H 19/123; B65H 2301/325; B65H 2301/3251; B65H 2301/364; B65H 2301/46011; B65H 2405/42; B65H 2402/351; B65H 2555/31; B25J 15/0047
See application file for complete search history.

(56) References Cited

U.S. PATENT DOCUMENTS 3,763,990 A * 10/1973 Ouska .................... B65G 47/24
198/412
4,430,040 A * 2/1984 Halmos ................. B21C 47/242
294/103.2
(Continued)

FOREIGN PATENT DOCUMENTS

DE 41 35 001 A1 6/1992
DE 102015208136 A1 * 11/2016 ............. B65H 19/00
(Continued)

*Primary Examiner* — Mark A Osele
(74) *Attorney, Agent, or Firm* — McGlew and Tuttle, P.C.

(57) ABSTRACT

The line comprises:
an unwinding section (3) for unwinding parent reels (Ba, Bb, Bm) of web material (Na, Nb), with at least a first unwinding station (5; 7);
at least a winding station (15) downstream of the unwinding section (3);
a feed path from the unwinding section (3) toward the winding station (15);
The unwinding section (3) is associated with a loading arrangement of the parent reels (Bm), which comprises: an upender (253; 306) configured to upend the parent reels (Bm) positioning them with their axis horizontal; and a loading robot (263; 313), configured to position a parent reel (Bm; Ba, Bb) on an unwinding mandrel (9) of the unwinding section (3).

20 Claims, 13 Drawing Sheets

(51) Int. Cl.
*B25J 15/00* (2006.01)
*B65H 19/18* (2006.01)
*B65H 18/10* (2006.01)

(52) U.S. Cl.
CPC ...... *B65H 2405/42* (2013.01); *B65H 2555/31* (2013.01); *B65H 2701/1924* (2013.01)

(56) References Cited

U.S. PATENT DOCUMENTS

| | | | | |
|---|---|---|---|---|
| 4,443,147 | A * | 4/1984 | Richards | B65G 61/00 414/744.3 |
| 5,490,756 | A * | 2/1996 | Reichert | B21C 47/242 414/619 |
| 5,657,524 | A * | 8/1997 | Kubala | B23P 19/022 254/3 R |
| 6,276,628 | B1 * | 8/2001 | Focke | B21C 47/242 242/559.1 |
| 8,353,662 | B2 * | 1/2013 | Barsacchi | B25J 15/0616 414/621 |
| 9,120,636 | B2 * | 9/2015 | Cavirani | B65H 19/12 |
| 2002/0054811 | A1 * | 5/2002 | Lofgren | B21C 47/242 414/619 |
| 2016/0060059 | A1 * | 3/2016 | Macura | B65H 16/10 242/555.1 |
| 2016/0060060 | A1 * | 3/2016 | Macura | B65H 16/04 242/558 |
| 2016/0130088 | A1 | 5/2016 | English | |
| 2017/0247214 | A1 * | 8/2017 | Wimmer | B65H 19/12 |

FOREIGN PATENT DOCUMENTS

| | | | | |
|---|---|---|---|---|
| GB | 2 104 469 A | | 3/1983 | |
| WO | WO 2016066596 A1 * | 5/2016 | ............ B65H 19/12 |
| WO | WO-2017221747 A1 * | 12/2017 | ............ B65H 19/12 |
| WO | WO-2018192808 A1 * | 10/2018 | ............ B65B 41/00 |

* cited by examiner

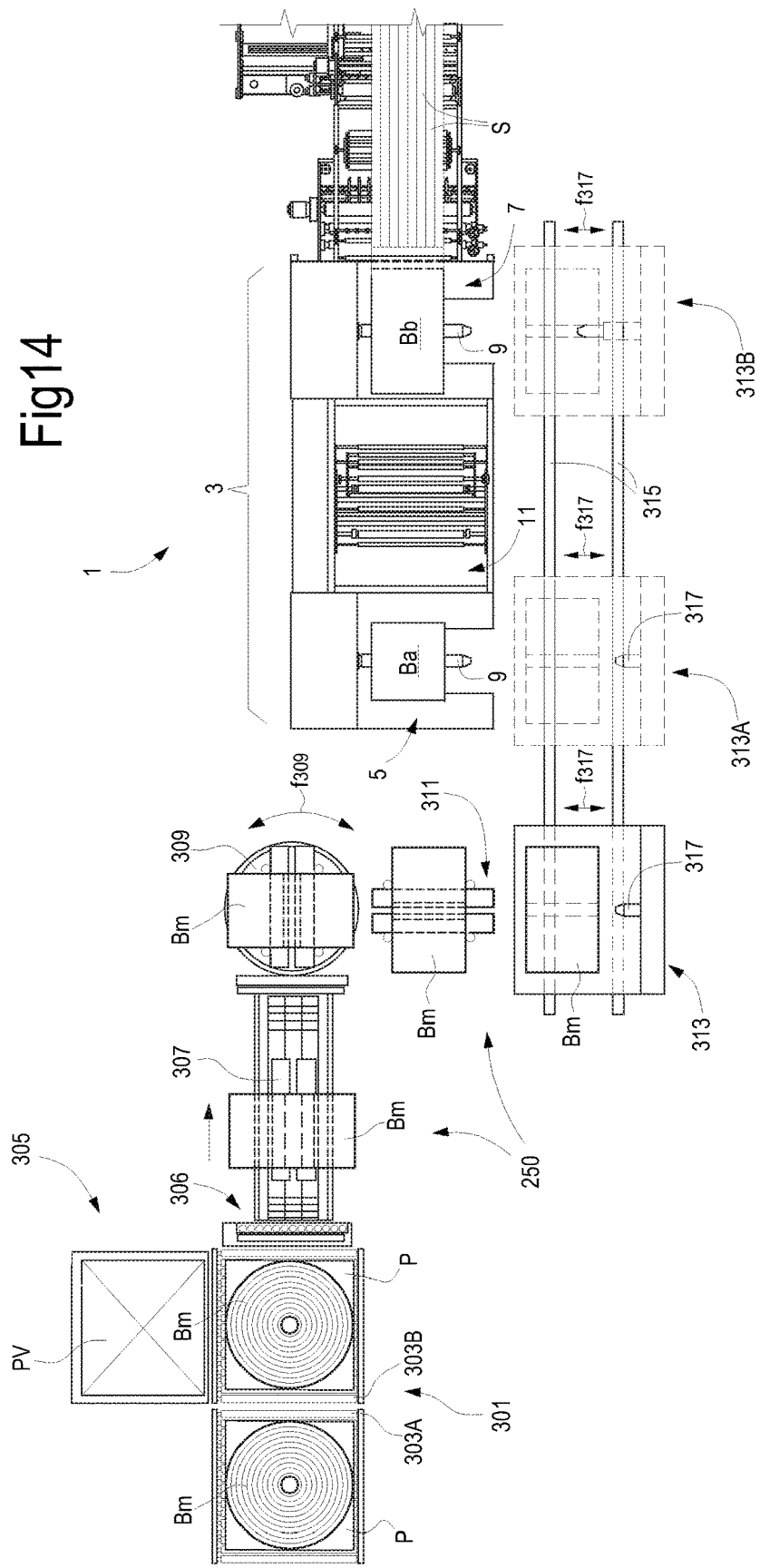

LINE FOR THE PRODUCTION OF SPOOLS OF WEB MATERIAL

TECHNICAL FIELD

The invention relates to machines and lines for the production of spools of web material, for example for the production of spools formed from strips of non-woven fabric.

Embodiments described herein relate in particular to improvements in the systems for loading parent reels into the unwinding stations, from which the web material forming the parent reels is fed along the converting line for the formation of smaller spools.

BACKGROUND ART

In many industrial sectors it is necessary to transform reels of web material of one size into spools of a different size, by means of a process of unwinding parent reels, or so-called jumbo reels, and rewinding them into spools with different size characteristics. In some cases the web material from a single parent reel is unwound and divided into longitudinal strips, each of which is wound onto a helically wound spool. The finished spools obtained in this way are used as semi-finished products to feed production lines for other articles.

Machines that produce spools of helically wound web material from parent reels are sometimes known as spooling machines. The web material can, for example, be a non-woven fabric. The helically wound spools that are obtained are used, for example, to feed machines for the production of sanitary towels, diapers and other hygienic and sanitary articles. The web material wound on the parent reels sometimes has a transversal size (corresponding to the axial dimension of the parent reel) 5-15 times the width of the individual longitudinal strips that are obtained by longitudinal cutting the web material on the parent reels. The individual strips are fed simultaneously to helical winding stations, in each of which a helically wound spool is formed. The winding stations are arranged in line one after the other in a machine direction, defined by the direction of advance of the longitudinal strips obtained by cutting the material on the parent reels. Each strip is fed to the respective winding station along a feed path.

As the web material in a single parent reel is subdivided into a plurality of strips, and as these are helically wound onto the helically wound spools, on which a large quantity of cut material can thus accumulate, the helically wound spool production cycle requires the use of a plurality of parent reels. In other words, if the web material from the parent reels is subdivided into N longitudinal strips, for simultaneous formation of N helically wound spools, in order to form the N helically wound spools a certain number M of parent reels will be required, where M is usually higher than 1, typically between 2 and 10, for example between 2 and 8, in certain cases between 2 and 6.

When a first parent reel finishes, it must be replaced by a second parent reel, and the trailing edge of the first web material coming from the first parent reel must be spliced to the leading edge of the second web material wound on the second parent reel. To reduce the time required to replace a parent reel, when it is finishing, with a new parent reel, the unwinding section of the machine usually comprises two unwinding stations, working alternately, and a welding station to weld the trailing edge of a first web material, coming from a first parent reel that is finishing, to the leading edge of a second web material, coming from a new parent reel that is standing-by.

The parent reels are cumbersome and heavy, and require complex operations to load them onto the unwinding stations.

There is consequently a need to optimize the loading operations for the parent reels, making them simpler and faster, in particular but not exclusively as regards spooling machines, for the production of helically wound spools.

SUMMARY OF THE INVENTION

To solve or alleviate one or more of the problems in the prior art, a line for forming spools of web material is provided, comprising: an unwinding section for unwinding parent reels of web material, comprised of at least a first unwinding station and a second unwinding station; at least a winding station downstream of the unwinding section; and a feed path from the unwinding section toward the winding station. Advantageously, the unwinding section can be associated with a loading arrangement of the parent reels in the unwinding section. The loading arrangement may comprise: an upender configured to upend the parent reels, positioning them with their axis horizontal; and a loading robot, configured to position a parent reel on an unwinding mandrel of the first unwinding station and of the second unwinding station selectively.

The loading arrangement allows faster, simpler and more efficient handling of the parent reels.

It may be advantageous to provide a welding station for welding to each other a first web material, coming from a first parent reel arranged in the first unwinding station, and a second web material, coming from a second parent reel arranged in the second unwinding station. In this way it is possible to manage the reel change cycles in a shorter time.

The line may comprise a plurality of winding stations, positioned in sequence, and a cutting station arranged between the unwinding section and the winding stations. The cutting station may comprise cutting members to divide the web material coming from the unwinding section into longitudinal strips.

In some embodiments, the winding station or stations are configured to form helically wound spools. In this case, each winding station may comprise a winding mandrel provided with a rotation movement about a rotation axis and with a translation movement in a direction parallel to the rotation axis, to form helically wound spools.

In advantageous embodiments, the loading robot may be a so-called anthropomorphic robot, that is to say one equipped with an anthropomorphic arm that is able to carry out movements using six numerically controlled axes. This allows fast, flexible handling of the parent reels, even when they vary considerably in diameter. Furthermore, the anthropomorphic arm allows various positions for the pick-up and release of the parent reels to be reached with ease, making operations quick and easy.

In other embodiments, a loading robot with only four numerically controlled axes can be used.

The web material, typically a non-woven fabric, usually has two opposite surfaces that have different characteristics, for example different levels of softness or a different level of roughness. The direction of rewinding of the longitudinal strips on the helical spools, that is to say with one or the other of the two surfaces facing the exterior of the spool, is not insignificant, and depends on the machining needs of the lines that will subsequently transform the helically wound spools. It is therefore useful to envisage the option of loading the parent reels onto the unwinding mandrels in two different positions, to unwind the web material selectively in a clockwise or anti-clockwise direction, so as to allow selection of which of the two surfaces of the web material is to face the outside of the helically wound spools.

For that purpose, according to some embodiments, the loading arrangement may comprise a rotary table, configured and arranged to rotate about a vertical axis. Each of the parent reels to be loaded in the unwinding section can be placed on the rotary table, with its winding axis horizontal. The rotary table turns the parent reel in such a way as to position it in the correct way according to the subsequent operation of loading onto the unwinding mandrel, so that the parent reel is unwound selectively in a clockwise or anti-clockwise direction, as required.

In some embodiments, the loading robot may comprise a manipulator configured to be inserted into tubular winding cores of the parent reels and equipped with an ejector to remove the parent reels from the manipulator and load them onto the unwinding mandrel of one or the other of the two unwinding sections. When the loading robot comprises an anthropomorphic arm, the manipulator can be applied to the end of the anthropomorphic arm.

The features of the manipulator described here can also be used in robots employed in other production lines, where there is the need to load reels of web material onto the spindles or mandrels of converting machines, for example unwinding machines or other machines.

In some embodiments the manipulator comprises an expandable shaft with a longitudinal axis. The expandable shaft may be associated with an ejector, configured and arranged to transfer a parent reel from the expandable shaft to the unwinding mandrel. The ejector can be mounted to be movable parallel to the longitudinal axis of the expandable shaft.

In possible embodiments, the expandable shaft houses moving members to move the ejector along the expandable shaft. This results in a particularly compact configuration of the manipulator. The moving members may comprise a screw or threaded bar and a nut meshed with the threaded bar. The endless screw is connected to the ejector, so that rotation of the threaded bar in one direction or the other causes translation of the ejector therealong.

The expandable shaft may comprise two co-acting portions extending parallel to the longitudinal axis of the shaft. One of the two portions may be fixed with respect to a supporting structure of the manipulator, while the other may be mobile with respect to the supporting structure, in a direction orthogonal to the longitudinal axis of the shaft. An actuator, for example a hydraulic or pneumatic cylinder-piston unit, may be used to separate the two portions of the expandable shaft. The actuator may be supported by the supporting structure on which the fixed portion of the shaft is mounted. On the same structure a motor may also be mounted, which controls movement of the ejector, for example an electric motor, or a hydraulic motor, which drives the threaded bar into rotation.

In some embodiments the expandable shaft may carry idle wheels or rollers, provided with rotation axes arranged at 90° with respect to the axis of the shaft, to facilitate sliding of the parent reel. This latter can rest with the inner surface of the tubular winding core on the idle rollers or wheels, thus facilitating axial movement of the reel with respect to the expandable shaft when transferring the parent reel from the manipulator to the unwinding mandrel in the unwinding station.

Further advantageous features and embodiments of the line and loading robot according to the invention are disclosed in the following description with reference to the attached drawings and in the claims, which form an integral part of this description. It must be understood that the features claimed with regard to the loading robot may be separated from the remaining features of the loading arrangements and of the line described herein.

BRIEF DESCRIPTION OF THE DRAWINGS

This invention will be better understood by following the description and the enclosed drawing, which shows a practical and non-limiting embodiment of the invention. More specifically, in the drawing

FIG. 14 shows a plan view of a further embodiment of the parent reel loading arrangement.

DETAILED DESCRIPTION OF EMBODIMENTS

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the following, specific reference is made to a spooling machine, i.e. to a helical winding machine, in which a web material is divided into a plurality of longitudinal strips, which are fed in parallel to a plurality of winding stations. In each winding station the winding devices are configured to form helically wound spools, giving the spool being formed a rotation movement around a rotation axis, and a reciprocating translation movement in a direction parallel to the axis of rotation. In other embodiments, not shown, a single winding station may be provided, if necessary with helical winding. In other embodiments, one or more winding stations may be provided for spiral winding, i.e. without the reciprocating translation movement.

Figure 1:
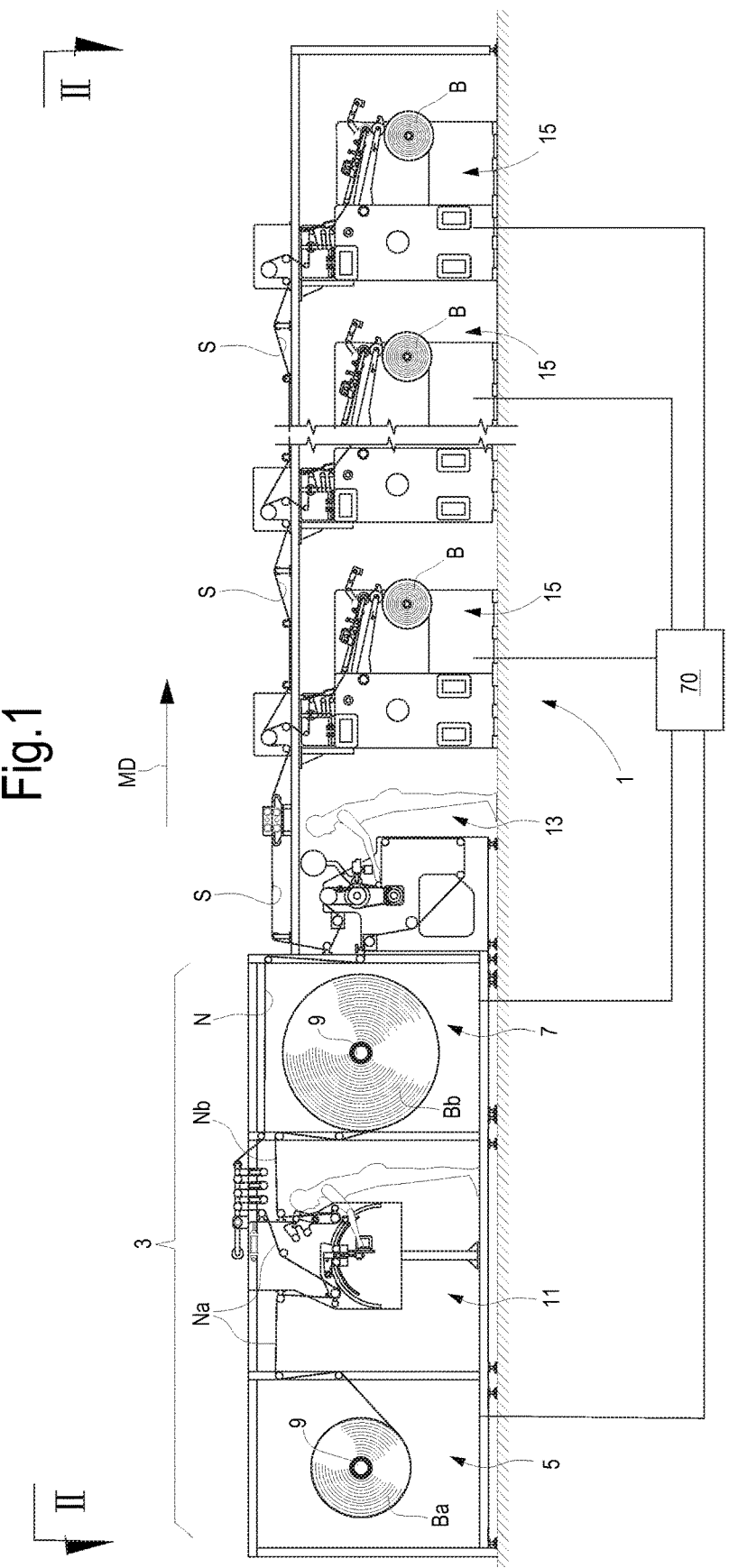
FIG. 1 shows a side view of the machine with its main stations.

FIG. 1 shows an overall side view of the machine for the production of helically wound spools. The machine is in reality a converting line inclusive of a plurality of stations. The machine is indicated as a whole by 1. It has an unwinding section 3, in which parent reels, also known as master rolls or jumbo rolls, are positioned, indicated with Ba and Bb in FIG. 1. In the embodiment illustrated, the unwinding section 3 comprises a first unwinding station 5 and a second unwinding station 7. The two unwinding stations 5 and 7 may be substantially symmetrical, and each have an unwinding mandrel, indicated with 9, on which the parent reels Ba, Bb are mounted. These latter contain a certain amount of web material, indicated with Na and Nb for the reels Ba and Bb of FIG. 1.

Between the two unwinding stations 5, 7 a cutting and welding station 11 may be arranged, wherein the tail of a web material from an exhausted parent reel positioned in one of the unwinding stations 5, 7 is welded to the leading edge of a web material on a parent reel standing-by in the other of the two unwinding stations 5, 7, to allow continuous working using a number of parent reels in sequence. The welding of web materials coming from successive parent reels takes place after slowing down or temporary stopping the unwinding of the reel that is finishing, as the machine described is of the start-stop type. In other embodiments the welding station may be located downstream of the two unwinding stations 5, 7. In yet other embodiments, more than two unwinding stations may be provided.

Figure 2:
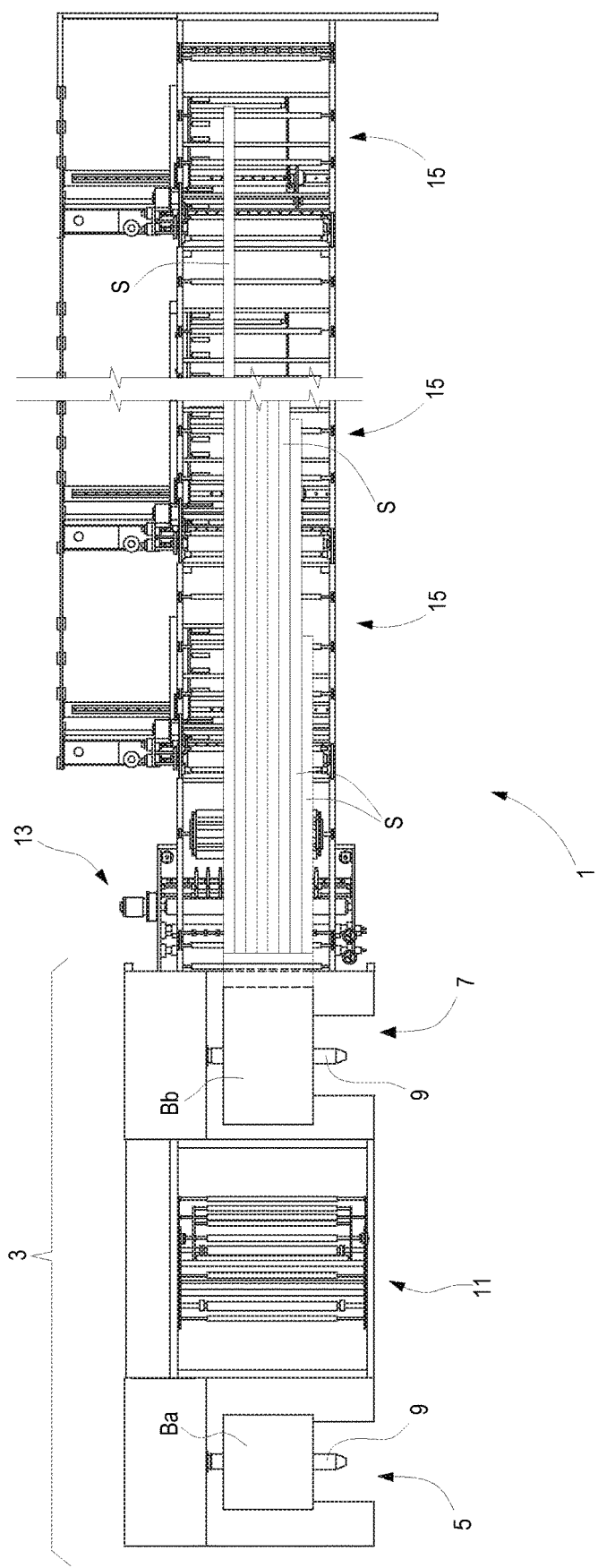
FIG. 2 shows a plan view along II-II of FIG. 1.

Downstream of the unwinding section 3 a cutting station 13 is provided, in which the web material fed by the unwinding section, generically indicated with N, is cut longitudinally and divided into a plurality of longitudinal strips S, which are fed to a plurality of helical winding stations, which can be the same as each other, each one indicated with 15. The helical winding stations 15 are arranged in sequence according to the machine direction, generically indicated by the arrow MD and represented by the direction in which the longitudinal strips S advance. For the purpose of illustration, FIGS. 1 and 2 are partial representations of just three winding stations 15, but it must be understood that the number of winding stations may vary from two to ten or more, if necessary, according to the number of longitudinal strips S into which a web material N can be divided.

Each strip S into which the web material N coming from the unwinding section 3 is divided advances along a path from the cutting station 13 to the respective winding station 15. In advantageous embodiments the feed path is located over the winding stations, but the option of arranging the feed paths under the winding stations must not be excluded.

The length of the path of each longitudinal strip S is different from the length of the paths of the remaining longitudinal strips, and depends on the position of the respective winding station 15, to which the longitudinal strip is fed.

Generically indicated with 70 is a control unit, for example a microprocessor, a micro-computer or a PLC, to control one or more of the stations making up the machine 1. In some embodiments the machine 1 may be provided with a plurality of PLCs or other dedicated local control units, for example, to supervise the operation of a part, section or station in the machine 1. The central unit 70 may be assigned to supervise and co-ordinate various local control units or local PLCs. In other embodiments a single control unit may be provided to manage the whole line or machine 1, or a plurality of the stations thereof.

Figure 3:
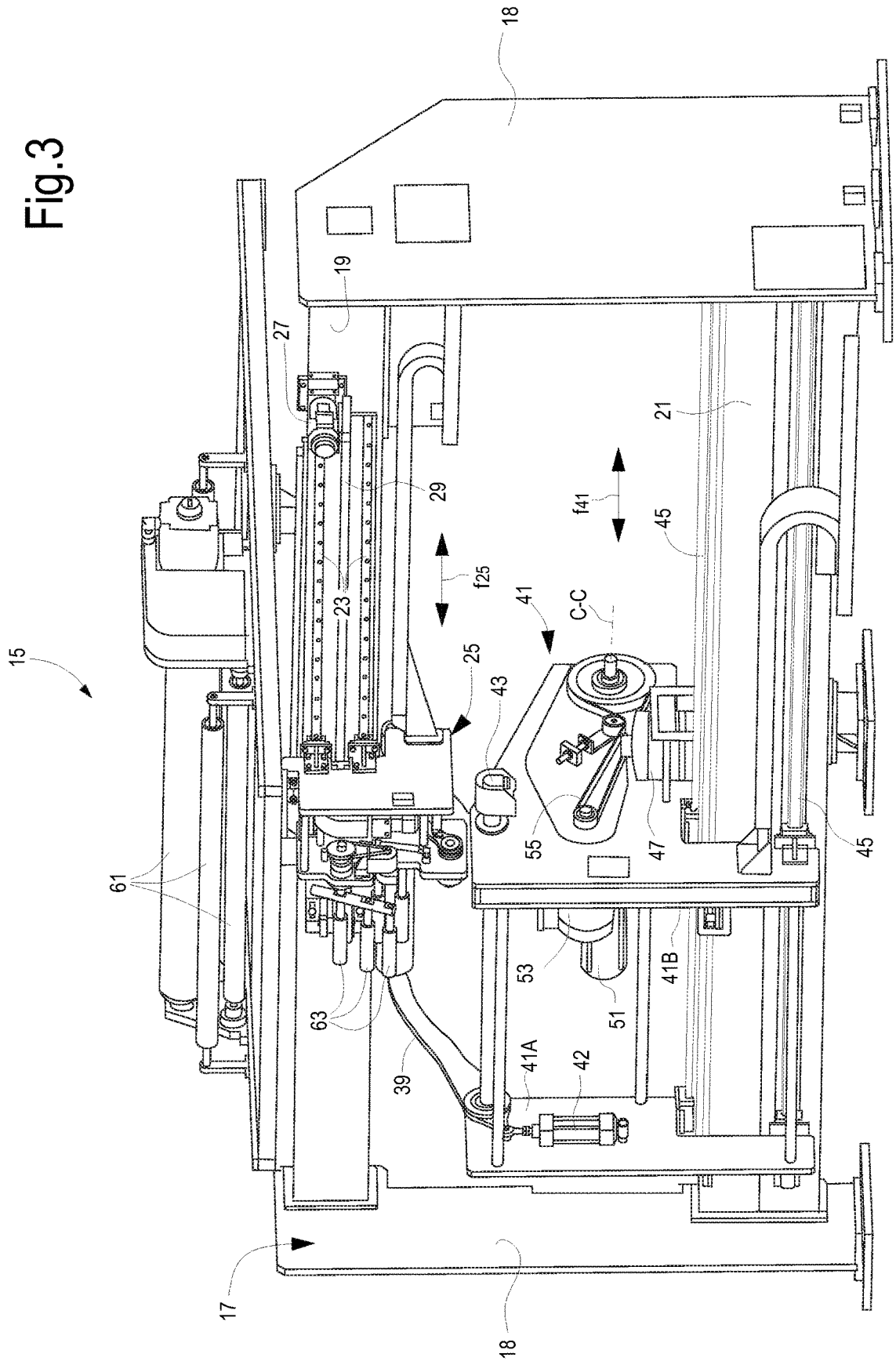
FIGS. 3 and 4 show axonometric views of a helical winding station.
Figure 4:
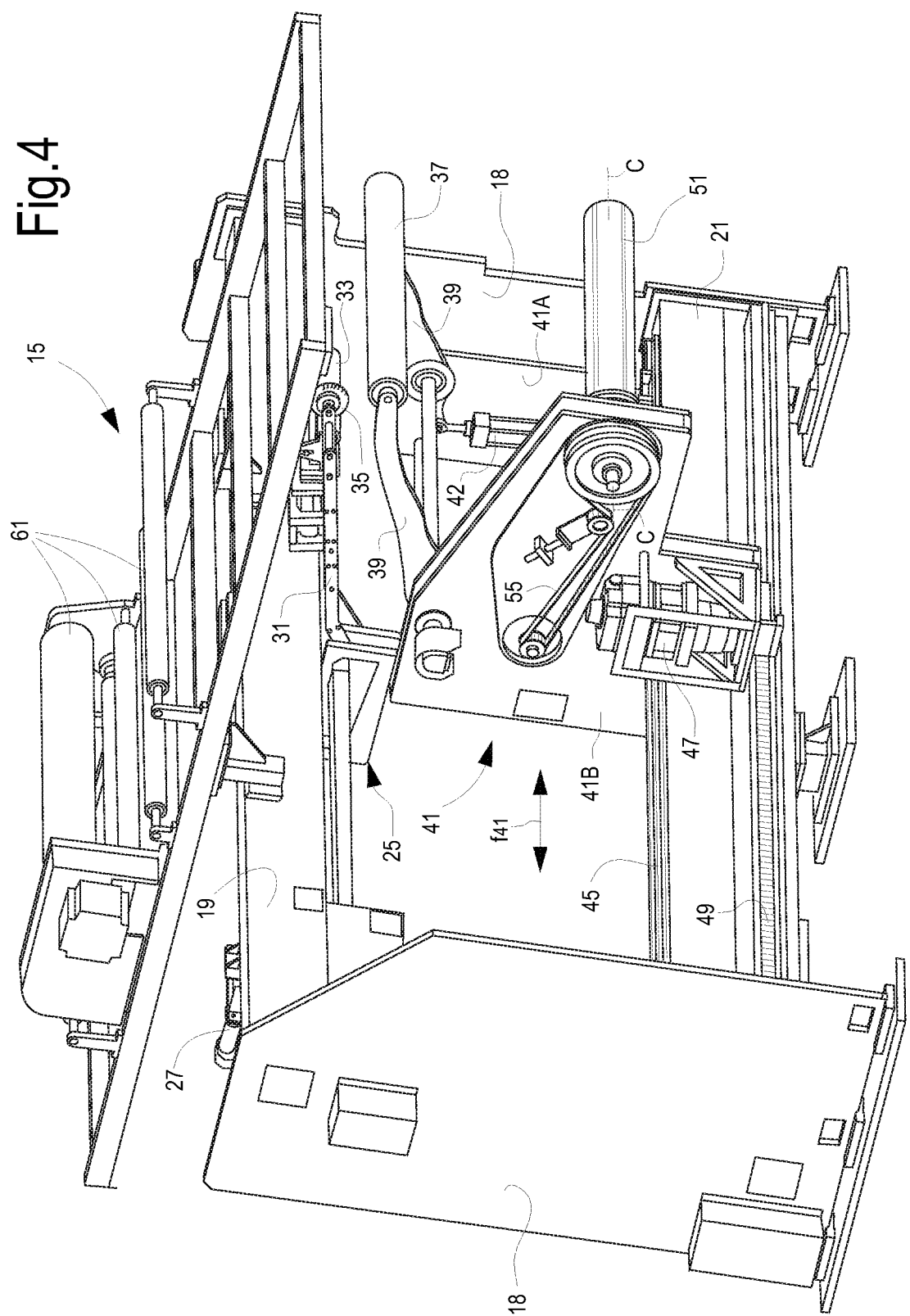
Figure 5:
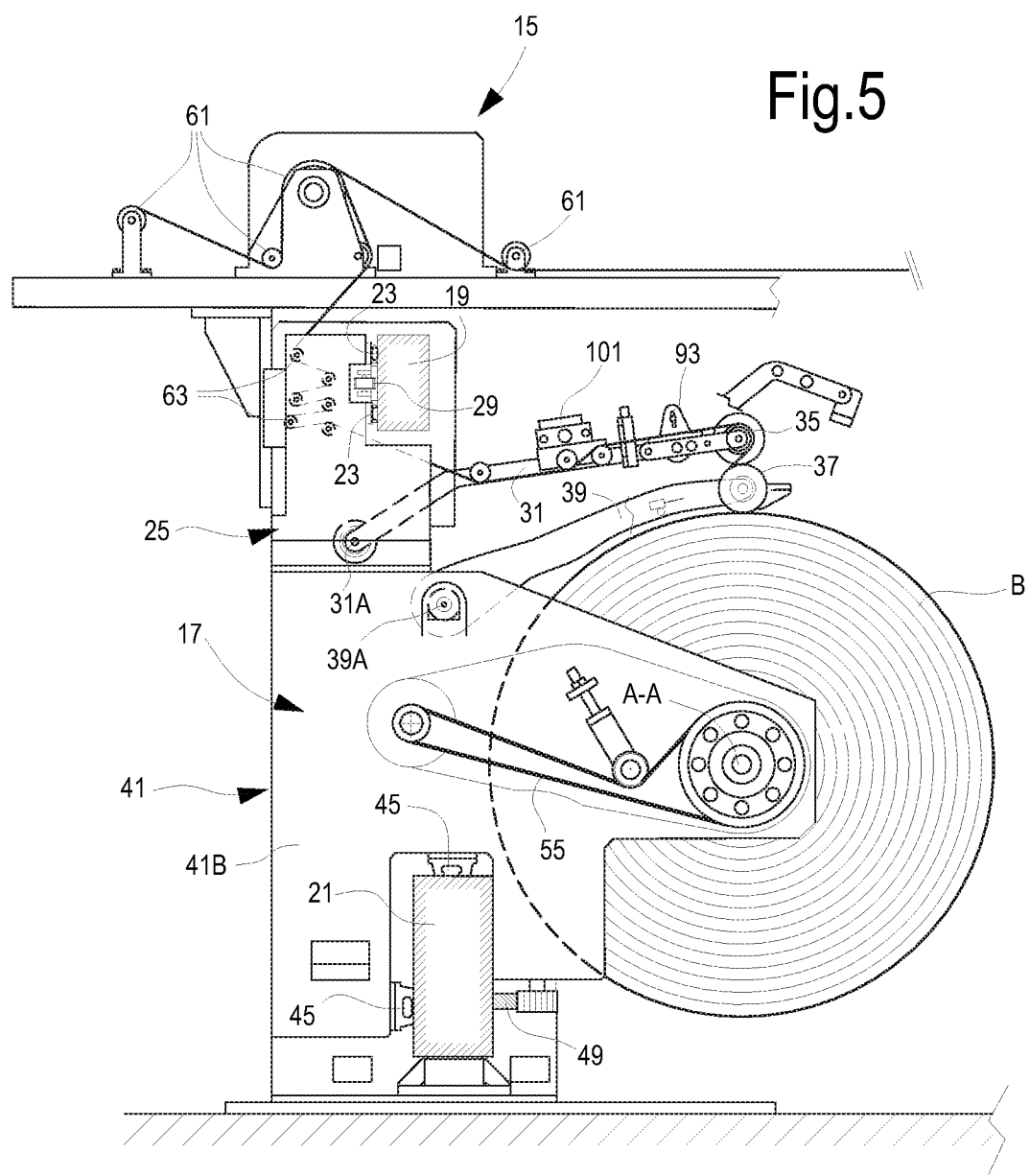
FIG. 5 shows an enlarged side view of a helical winding station.
Figure 6:
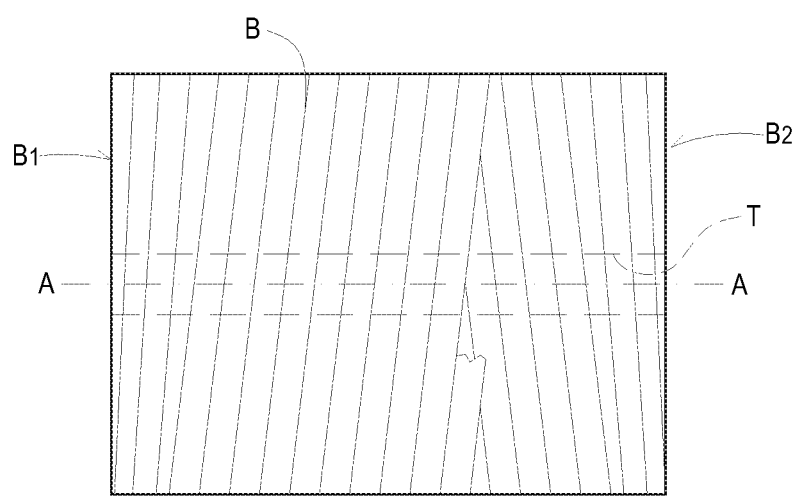
FIG. 6 shows a diagram of a helically wound spool obtained using a helical winding station according to FIGS. 3 to 5.

FIGS. 3-5 show in greater detail a possible configuration of a helical winding station 15, while FIG. 6 shows a diagram view of a helically wound spool obtained using a winding station 15. As shown in FIG. 6, the strip S that forms the helically wound spool B forms helical turns around a tubular winding core T. A-A indicates the winding axis of the helically wound spool B, and B1, B2 indicate the two axial ends of the helically wound spool B.

The general structure of the helical winding station 15 is clearly shown in FIGS. 3 to 5. It comprises a bearing structure 17, which may comprise a pair of side walls 18, an upper crossbeam 19 and a lower crossbeam 21 joining the two side walls 18. On the upper crossbeam 19 first guides 23 can be provided, along which a slide 25 can move in a direction f25. Reference 27 indicates a motor that, by means of a belt 29, a threaded bar or other suitable transmission member, controls the movement of the slide 25 along the guides 23. In other embodiments, the movement may be controlled by an electric motor mounted on the slide 25, which rotates a pinion meshing with a rack constrained to the crossbeam 21.

The slide 25 carries a pivoting guide arm 31, pivoted at 31A to the slide 25 and which has the function of guiding the longitudinal strip S fed to the helical winding station 15. The guide arm 31 can support at its distal end a guide roller 33, having an axial length sufficient to receive the longitudinal strip S having the maximum width allowed by the machine 1. The guide arm 31 may be lifted and lowered by pivoting around the axis 31A. In some embodiments the guide roller 33 may be interchangeable according to the transversal size of the longitudinal strip S, for instance.

A wheel or support roller 35 can be mounted coaxially to the guide roller 33, with which the guide arm 31 rests on a contact roller 37. The contact roller 37 may be idly mounted on arms 39 hinged around a pivoting axis 39A to a carriage 41. Reference number 42 indicates a cylinder-piston actuator that can control the lifting and lowering movement of the arms 39 around the pivoting axis 39A. The arms 39 can be associated with an encoder 43 that can detect the angular position of the arms 39 with respect to the carriage 41.

The carriage 41 may comprise two side walls 41A, 41B joined together by crossbeams, bars or beams. Carriage 41 may move with a reciprocating translation motion according to the double arrow f41 along guides 45 that can be constrained to the lower beam 21. The reciprocating translation motion of carriage 41 according to the double arrow f41 can be controlled by an electric motor 47. In the embodiment illustrated the electric motor 47 is mounted on the carriage 41 and comprises a pinion in mesh with a rack 49 constrained to the beam 21. In other embodiments, other drive mechanisms can be foreseen, for example using a fixed motor and a screw or threaded bar. By coacting with a stationary rack 49, the motor 47 on board the carriage 41 allows high linear accelerations of the carriage 41 to be obtained.

A winding mandrel 51 can be mounted on the carriage 41, with a rotation axis substantially parallel to the axis of the contact roller 37 and to the pivoting axis 39A or the arms 39 that supports the contact roller 37, as well as to the reciprocating straight movement direction according to f41 of the carriage 41. The winding mandrel 51 can be driven into rotation by an electric motor 53 that can be carried by the carriage 41. For example, the winding mandrel 51 and the motor 53 can be carried by the side wall 41B of the carriage 41. A belt 55 can be provided to transmit the motion from the motor 53 to the winding mandrel 51. The rotation axis of the winding mandrel 51 is labeled C-C. This rotation axis coincides with the axis A-A of the spool B forming around the winding mandrel 51.

The structure described above allows the winding mandrel 51 to perform a double winding motion, and more specifically: a rotation movement around its own axis C-C, controlled by motor 53; and a reciprocating translation motion indicated by the double arrow f41 and controlled by motor 47. When a tubular winding core T is mounted on the winding mandrel 51, helical winding of the longitudinal strip S illustrated in FIG. 6 is achieved. During the helical winding movement the guide roller 33 may remain substantially stationary in the transversal direction, i.e. in direction f25, while it may rise gradually, together with the contact roller 37, as the diameter of the helically wound spool B increases in size. The encoder 43 may detect the angular position of the arms 39 and may therefore provide a measurement of the diameter of the helically wound spool B being formed on the winding mandrel 51.

Guide rollers for the longitudinal strips S above the winding stations 15 are indicated with 61. Tensioning rollers for the longitudinal strip S fed to each of the winding stations 15 are indicated with 63. The tensioning rollers 63 define a zig-zag path for the longitudinal strip S to form a sort of festoon. Some of the tensioning rollers 63 have a mobile axis to maintain the longitudinal strip S tensioned as required.

The machine 1 described so far operates as follows. At least one parent reel Ba or Bb is placed in at least one of the two unwinding stations 5, 7. The web material Na or Nb from the parent reel is unwound and fed through the cutting station 13, where the web material is cut into a plurality of longitudinal strips S. Each longitudinal strip S is fed to one of the helical winding stations 15 to form respective helically wound spools B. In order to be formed, each helically wound spool B usually requires the use of more than one parent reel Ba, Bb. Typically, between two and five parent reels Ba, Bb are necessary to form a series of helically wound spools B, but this number must not be considered to be limiting. As a result, when a parent reel unwinding in one of the unwinding stations 5, 7 finishes, its trailing edge is joined to the leading edge of a second parent reel that has been prepared and is waiting in the other of the two unwinding stations 5, 7. Welding takes place in the welding station 11. Welding usually takes place at low speed or with the machine stopped. Consequently, the machine 1 is slowed down or stopped when the parent reel being used has to be replaced. In other embodiments a supply of web material or longitudinal strips S can be provided, formed for example using a plurality of mobile guiding rollers. This supply may allow the winding stations 15 to continue working, if necessary at a reduced speed, even if the parent reels are stopped and no web material Na, Nb is being delivered by the unwinding station 3 for the time necessary to replace the parent reel.

When the helically wound spools B have been completed, they are removed from the winding mandrels 51 in the winding stations 15 and replaced by new tubular winding cores to start the next winding process.

The operation is usually carried out in such a way that all the helically wound spools B are completed at the same time, and can thus be replaced all together, stopping the machine 1 for the minimum amount of time possible. For that purpose the machine 1 is slowed down until it stops, that is to say until the feeding speed of the longitudinal strips S is reduced to zero.

Figure 7:
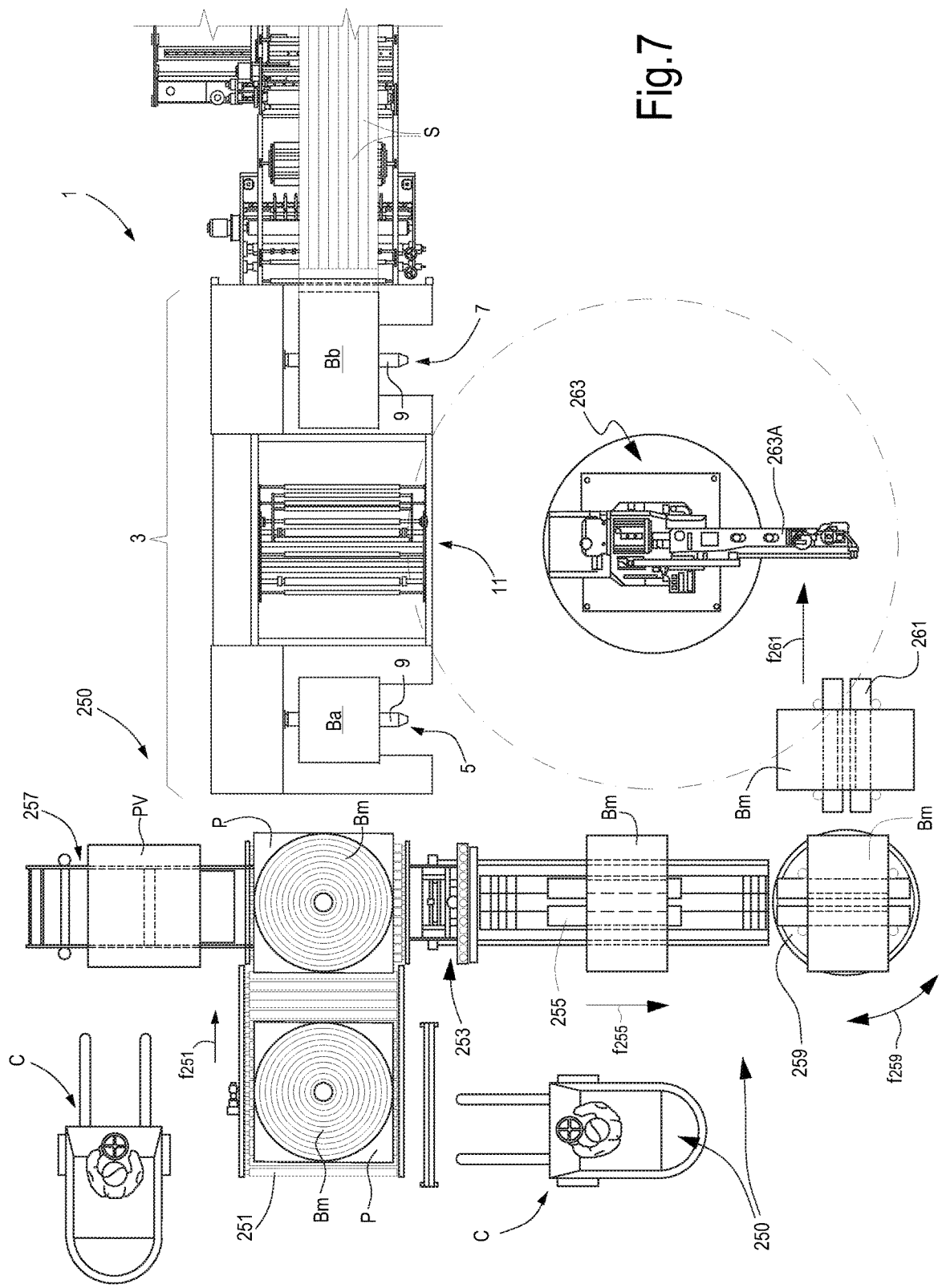
FIG. 7 shows a plan view of the unwinding section with the components of an arrangement for loading the parent reels in a possible embodiment.

To simplify and speed up loading of parent reels or master rolls Ba, Bb onto the unwinding mandrels 9 in the unwinding section 3, in some embodiments the machine described above is inserted in a line that comprises a system for manipulation of the parent reels, that is to say a loading device to load the parent reels onto the unwinding mandrels 9. A possible configuration of this loading arrangement is illustrated in FIG. 7, where a portion of the machine 1 described thus far is also shown.

The loading arrangement is indicated as a whole with 250. In the embodiment illustrated in FIG. 7 the loading arrangement 250 comprises a first conveyor 251, for example a roller bed, on which pallets P can be loaded. One or more parent reels, indicated here with Bm, can be placed on each pallet P. The parent reels Bm are arranged on the pallet with their vertical winding axis orthogonal to the pallet support surface, that is to say orthogonal to the support surface defined by the conveyor 251. Fork lift trucks or other self-moving means are indicated with C, to manipulate the pallets P, by means of which the pallets P with the respective parent reels Bm are loaded onto the conveyor 251.

In some embodiments the first conveyor 251 is associated with an upender 253, represented schematically and known per se, which picks up the individual parent reels Bm from a pallets P on the conveyor 251 and arranges them on a second conveyor 255. The upender 253 can be arranged in the vicinity of an end of the first conveyor at a distance from the loading area for the pallets P. These latter are moved forwards by the first conveyor 251 in the direction of arrow f251 from the loading area to the area in which they are picked up by the upender 253.

The first conveyor 251 can be associated with a device 257 to remove the empty pallets (one of which is indicated with Pv in FIG. 7), for example to allow them to be picked up by a fork lift truck C.

In some embodiments, the second conveyor 255 is associated with a rotary table 259, configured to turn in the direction of arrow f259 around a vertical axis. The rotary table 259 can be arranged at an end of the second conveyor 255 opposite to the end adjacent to the first conveyor 251.

The rotary table 259 can be associated with a third conveyor 261, herein also referred to as outfeed conveyor, which can move the parent reels Bm away in the direction of the arrow f261 from the rotary table 259. The third conveyor 261 can be arranged approximately at right angles to the second conveyor 255. In other embodiments the third conveyor 261 can be omitted.

The rotary table 259 can be associated with a loading robot, indicated as a whole with 263 and referred to hereafter simply as robot. In the embodiment of FIG. 7 the robot 263 is a so-called anthropomorphic robot, i.e. one with a jointed arm having a plurality of numerically controlled axes of rotation, to simulate the movements of a human arm and hand. In the loading arrangement of FIG. 7 the robot 263 is stationary with respect to the floor. The ample movements of the anthropomorphic arm 263A of the robot 263 allow the latter to perform all the movements necessary to load the parent reels Bm onto the unwinding mandrels 9 in the unwinding section 3 without the need to move with respect to the floor, in the manner described hereinafter.

However, the option of using a robot 263 that is mobile with respect to the floor, for example on rails or on a cross guide, should not be excluded, to allow the robot 263 to move in one or two directions, optionally at right angles to each other.

Figure 8:
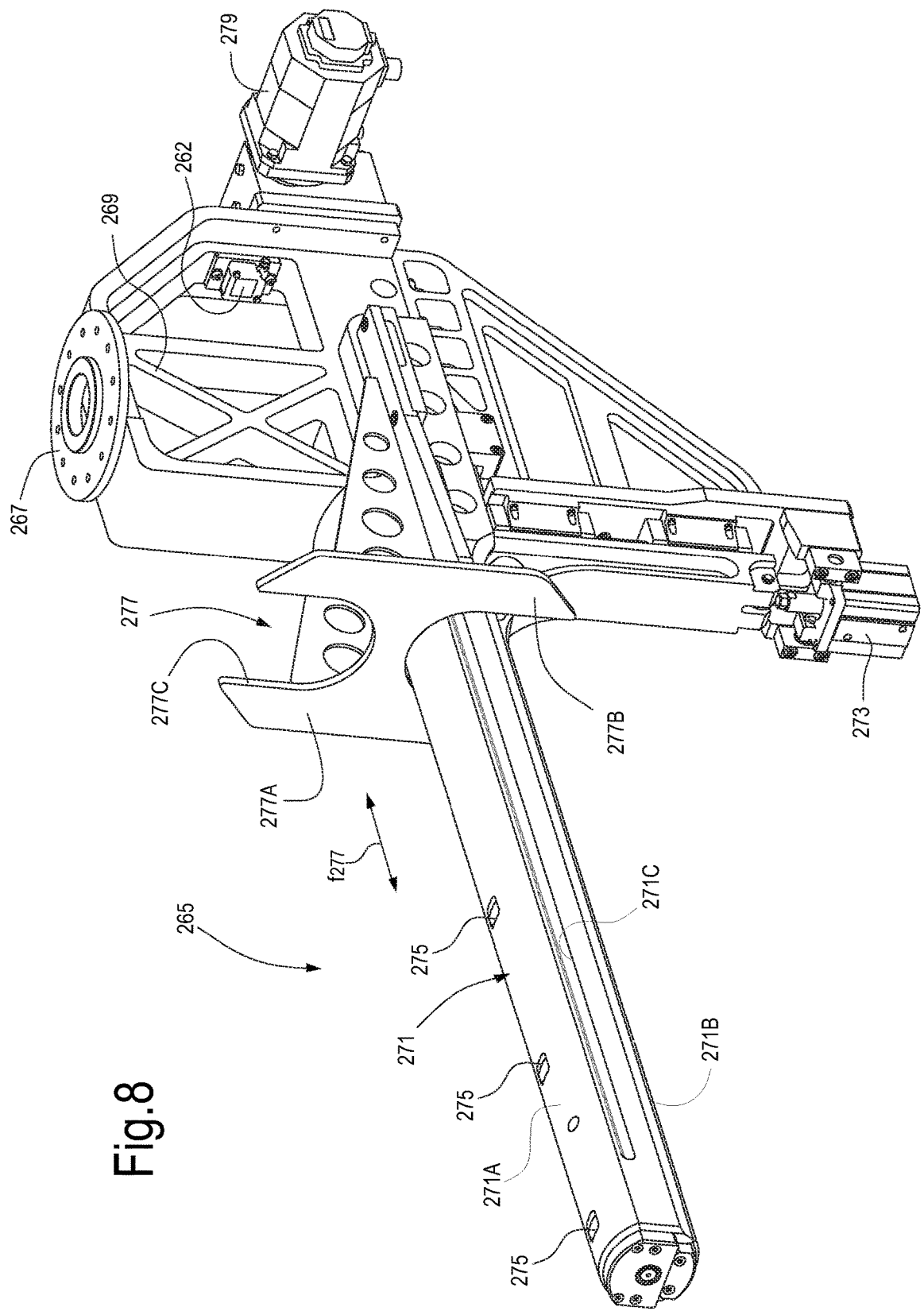
FIG. 8 shows an axonometric view of a manipulator of a robot for loading of the parent reels.
Figure 9:
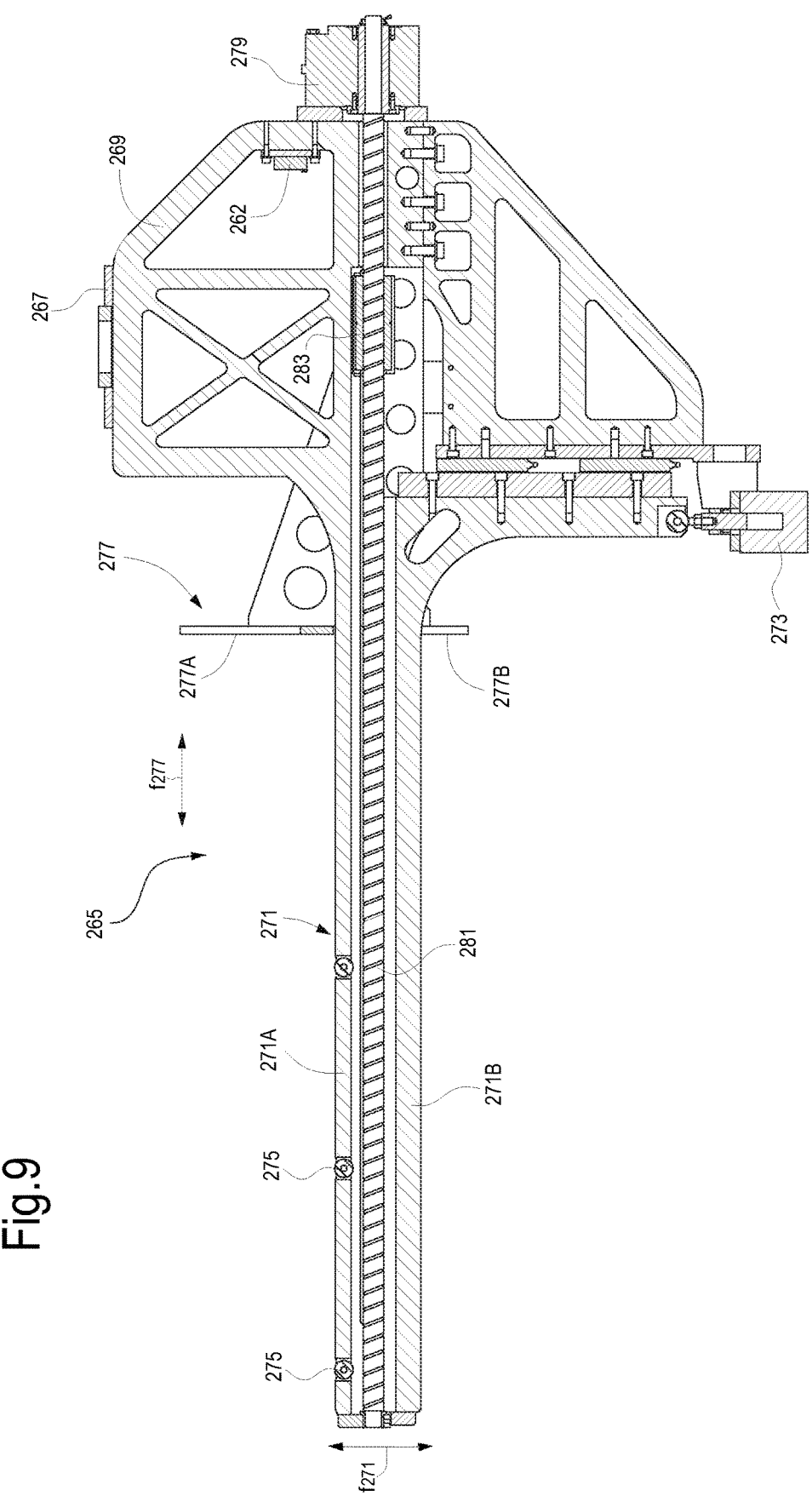
FIG. 9 shows a longitudinal cross-section of the manipulator of FIG. 8.
Figure 10:
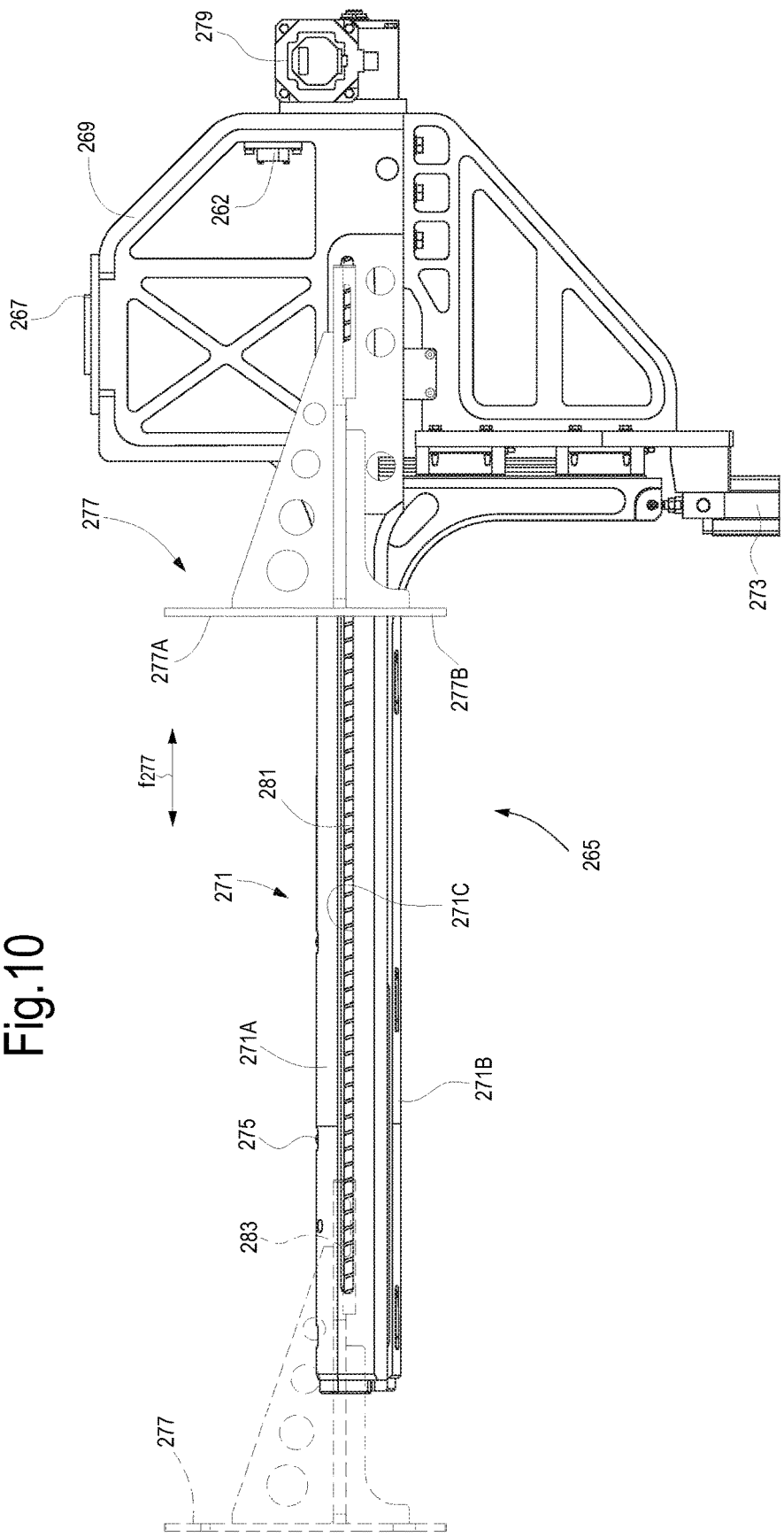
FIG. 10 shows a side view of the manipulator of FIGS. 8 and 9.

The anthropomorphic arm 263A may be provided with a manipulator, indicated as a whole with 265, shown in greater detail in FIGS. 8 to 10. The manipulator 265 comprises a flange 267, by means of which it is applied to the anthropomorphic arm 263A of the robot 263. The flange 267 is fixed to a supporting body or structure 269 of the manipulator 265, on which an expandable shaft 271 is mounted, configured to be inserted in the tubular winding cores of the parent reels Bm.

In some embodiments the expandable shaft 271 may comprise two portions 271A, 271B, which extend in the longitudinal direction of the expandable shaft 271. The two portions 271A, 271B can be separated from one another in a direction f271 orthogonal to the direction of longitudinal extension of the expandable shaft 271. The expansion movement in the direction f271 can be controlled by an actuator 273, for example a pneumatic or hydraulic cylinder-piston actuator. This movement allows the shaft 271 to expand in a radial direction when it is inserted in the tubular winding core of a parent reel Bm, to grip it firmly and allow handling thereof by the robot 263.

On the upper area of the portion 271A of the expandable shaft 271 idle wheels or rollers 275 can be mounted, which rotate around respective rotation axes set at 90° to the longitudinal axis of the expandable shaft 271. The idle wheels or rollers 275 form a low-friction support for the parent reels Bm, to facilitate sliding of the parent reels Bm along the expandable shaft 271.

The expandable shaft 271 can be associated with an ejector 277, moving in the direction of the double arrow f277 parallel to the expandable shaft 271. The movement according to f277 of the ejector 277 can be controlled by an actuator 279, for example an electric motor, a mechanical or hydraulic jack or any other actuator. The actuator 279 can rotate a threaded bar or a ball screw 281, which extends parallel to the expandable shaft 271 and can be housed inside it.

For example, the threaded bar 281 can be supported in the upper portion 271A of the expandable shaft. The threaded bar 281 meshes with a nut 283, constrained with the ejector 277. In this way the ejector 277 can be moved in the direction of the double arrow f277 by the actuator 279. FIG. 10 indicates, respectively with a solid line and a dotted line, two end positions that can be taken by the ejector 277. More specifically, the solid line indicates a retracted position and the dotted line indicates an extracted position. In the latter the ejector 277 can protrude beyond a distal end of the expandable shaft 271.

To allow the ejector 277 to be connected to the endless screw 283 and to allow the ejector 277 to move in the direction f277, in some embodiments the portion 271A of the expandable shaft 271 has two parallel side slots or openings 271C, through which the ejector 277 is mechanically connected to the endless screw 283.

In the embodiment illustrated, the ejector 277 has a thrust plate 277A, which co-acts with the parent reel Bm engaged by the manipulator 265. The thrust plate 277A may be approximately orthogonal to the longitudinal axis of the expandable shaft 271.

In certain embodiments the thrust plate 277A has a first recess 277B and a second recess 277C. The two recesses may be substantially opposite. The first recess 277B allows the thrust plate 277A to surround the expandable shaft 271 and to slide therealong in the direction f277. The thrust plate 277A thus forms a thrust surface that has a balanced action on the base of the parent reel Bm that is engaged on the expandable shaft 271. The second recess 277C allows the thrust plate 277A to slide along the unwinding mandrel 9 to push a parent reel Bm along the unwinding mandrel 9 into any axial position along the mandrel itself, using a movement of the manipulator 265, or to extract a finished tubular winding core from the unwinding mandrel 9.

In other embodiments, ejection of the tubular winding cores from the unwinding mandrel 9 can be carried out by an ejector located in the unwinding station or by another device provided for that purpose.

Operation of the loading arrangement 250 described thus far is as follows: A pallet P on which one or more parent reels Bm are stacked is loaded onto the first conveyor 251 and moved to in front of the upender 253. One parent reel Bm at a time is picked up from the pallet P, turned until its axis is horizontal and placed on the second conveyor 255. The latter moves one parent reel Bm at a time forward until it is on the rotary table 259.

The rotary table 259 turns the parent reel Bm so that it is positioned with the winding axis at 90° with respect to the orientation of said axis when the parent reel Bm is on the second conveyor 255.

From the rotary table 259 the parent reel Bm is moved forwards by the outfeed conveyor 261 so as to approach the range of action of the robot 263, to be engaged by the manipulator 265 mounted on the anthropomorphic arm 263A of the robot 263. The latter then provides for loading the parent reel Bm onto one or the other of the two unwinding mandrels 9 in the two unwinding stations 5, 7 of the unwinding section 3.

For that purpose, once the expandable shaft 271 has been inserted in the winding core of the parent reel Bm, it is expanded to engage the parent reel Bm. The arm 263A of the robot 263 brings the expandable shaft 271 into axial alignment with the mandrel 9 onto which the parent reel Bm must be loaded, the expandable shaft 271 is retracted once again and the pusher 277 is activated to push the parent reel Bm in an axial direction from the expandable shaft 271 onto the mandrel 9. If necessary, once the parent reel Bm has been loaded onto the mandrel 9, the manipulator 265 can be moved to the position shown in FIG. 11 and used to slide the parent reel Bm further along the unwinding mandrel 9, into the required axial position. The unwinding mandrel 9 is then expanded, in a known manner, to lock the parent reel Bm thereon, and it is brought into rotation to unwind the web material N.

Figure 11:
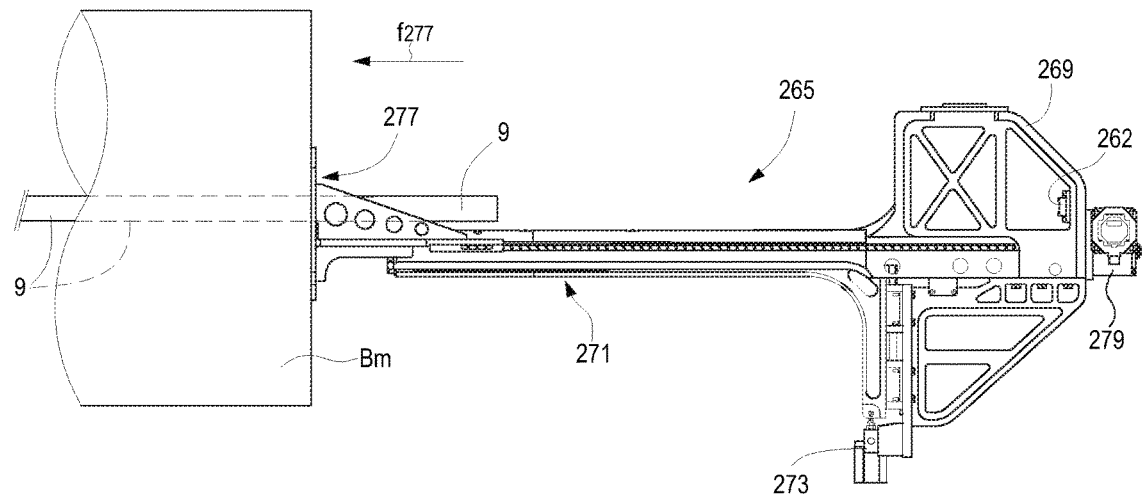
FIG. 11 schematically illustrates the operation of the manipulator in a possible loading phase of a parent reel Bm onto the unwinding mandrel 9.

The same manipulator 265 can also be used to unload exhausted tubular winding cores from the winding mandrel 9. For that purpose it is sufficient to embrace the unwinding mandrel 9 with the thrust plate 277A, as shown in FIG. 11, but placing the thrust plate 277A between the support of the unwinding mandrel 9 and the exhausted tubular winding core. When the manipulator 265 is moved away from the support of the unwinding mandrel 9 the winding core is removed in an axial direction from the unwinding mandrel 9.

The rotary table 259 can be configured to turn alternately in a clockwise or anticlockwise direction, or in one direction only. In any case, the rotary table 259 is controlled so that the parent reel Bm can be turned around the vertical rotation axis of the rotary table 259, so that selectively one or the other of the two bases or flat surfaces of the parent reel Bm is turned towards the robot 263. In this way it is possible to mount the parent reel Bm on the unwinding mandrel 9 so that it can be unwound in a clockwise or anticlockwise direction, respectively. This can be useful because the opposite surfaces of the web material making up the parent reel Bm may have different characteristics, for example a different roughness. The end user of the helically wound spools B produced by the machine 1 may require that in the helically wound spools the longitudinal strip S be wound with one or the other of the two opposite surfaces facing outwards.

Figure 12A:
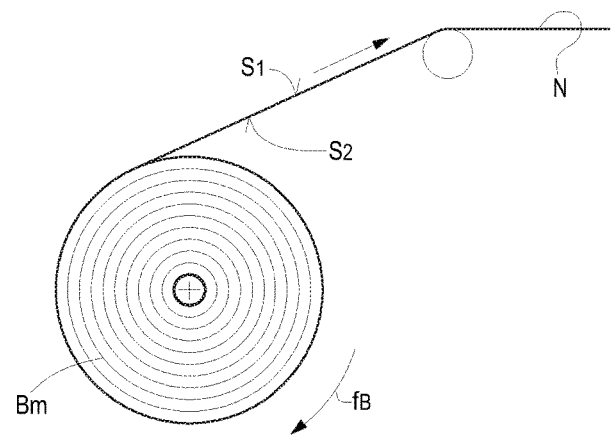
FIG. 12A is a diagram showing one of two ways in which a parent reel can be positioned in the unwinding station.
Figure 12B:
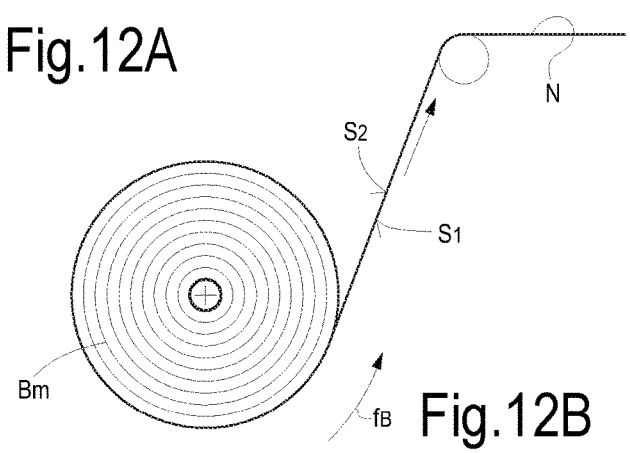
FIG. 12B is a diagram showing another one of two ways in which a parent reel can be positioned in the unwinding station.

Rotation of the rotary table 259 allows the parent reel Bm to be placed in two distinct positions on the unwinding mandrel 9, as shown schematically in FIGS. 12A and 12B. In FIG. 12A the parent reel Bm is positioned in such a way that the web material N unwinds with the surface S1 (external on the reel Bm) faceing upwards. The reel Bm unwinds (arrow fB) in a clockwise direction. In FIG. 12BA the same parent reel Bm is positioned in such a way that the web material N unwinds with the surface S2 (internal on the reel Bm) facing upwards, that is to say in the opposite way to that shown in FIG. 12B. The parent reel Bm turns in an anticlockwise direction (arrow fB in FIG. 12B).

The unwinding method (clockwise or anticlockwise) and therefore the orientation of the surfaces S1, S2 of the web material N is selected based on rotation (by 90° in a clockwise or anticlockwise direction, or else selectively by 90° or by 270°) imposed on the parent reel Bm by the rotary table 259. According to how the web material N is unwound from the parent reel Bm, the helically wound spools B will have the surface S1 or the surface S2 of the longitudinal strip facing outwards.

In advantageous embodiments, the robot 263 may comprise devices capable of facilitating the positioning of the manipulator with respect to the parent reel to be picked up. This may be particularly useful in certain cases, when the web material N making up the parent reels Bm is such that the reels are not rigid, but soft and subject to radial deformation under their own weight. This occurs, for example, in the case of reels of non-woven fabric. The deformation cannot be foreseen and depends on the characteristics of the web material N, as well as the winding parameters, for example the winding density. Thus, the position of the axis of the parent reel Bm that is on the outfeed conveyor 261 is only known with a certain level of approximation. By fitting the arm of the robot 263 with a device to locate the hole of the reel, i.e. the tubular winding core, it is possible to insert the expandable shaft 271 of the manipulator 265 into the hole with greater ease. For that purpose, a laser device 262 can be used, carried by the manipulator, which emits a laser beam that can be orthogonal to the axis of the expandable shaft 271. The robot can be programmed to bring the manipulator 265 in front of the parent reel Bm, which is placed on the outfeed conveyor 261, in a position approximately corresponding to that of the axis of the parent reel Bm. With a back and forth movement along two axes orthogonal to the axis of the reel, the laser device 262 is able to identify the edges of the axial hole, that is to say the inner edges of the tubular winding core, identifying the position of the reel axis with precision. This position is then used by the robot to insert the expandable shaft. The possibility of using different devices to locate the tubular winding core of the parent reels, for example a viewing system, shall not be excluded.

Figure 13:
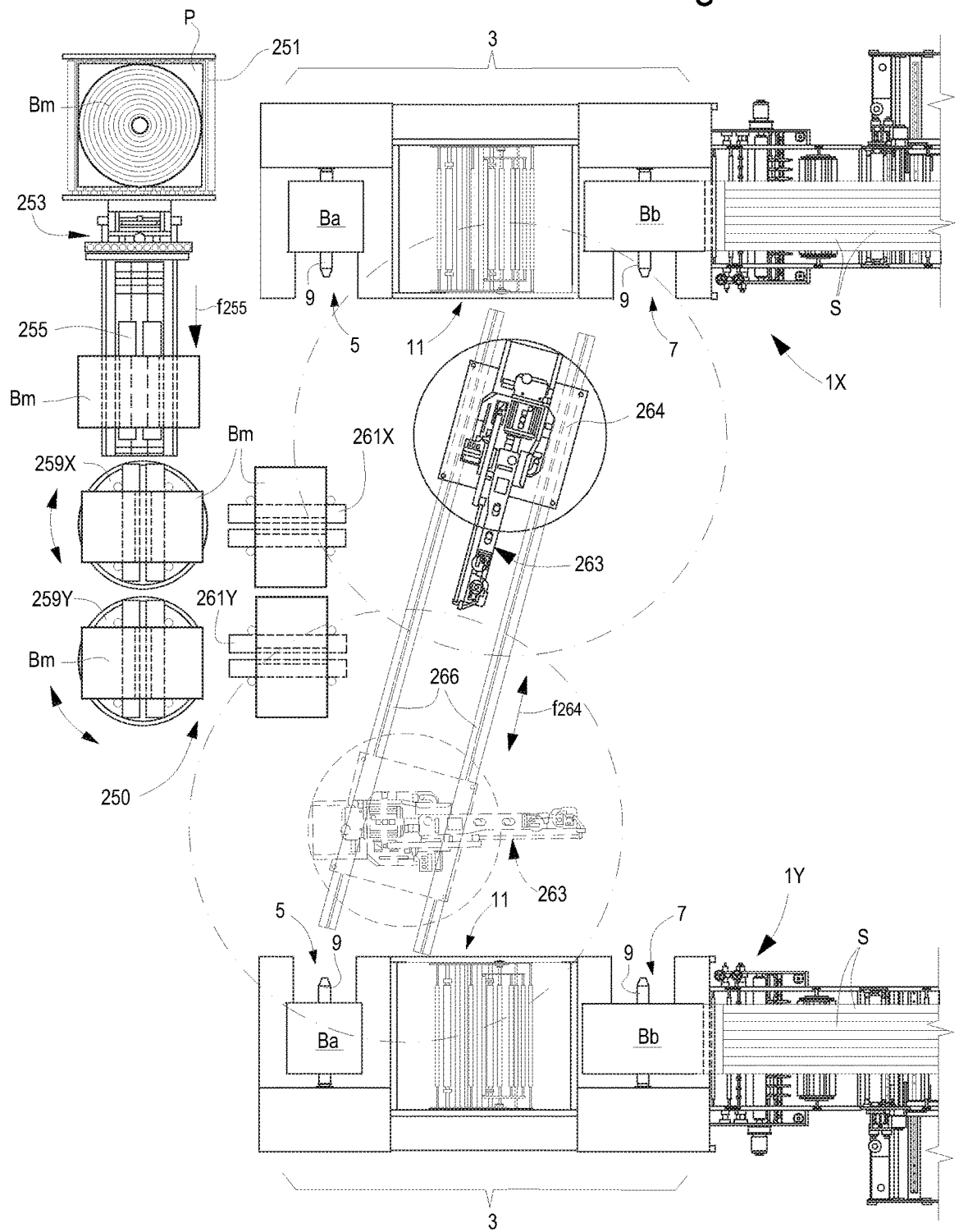
FIG. 13 shows a plan view of a parent reel loading arrangement to serve two production lines.

In the embodiment illustrated in FIG. 7 the robot 263 serves a single production line, that is to say a single machine 1. The option of using the same robot 263 to load parent reels Bm coming from the same conveyor onto two machines 1 standing side by side shall not be excluded. A configuration of this type is shown in FIG. 13. Here, the same numbers indicate parts that are the same or equivalent to those of FIG. 7, and which will not be described again. In the embodiment of FIG. 13 the second conveyor 255 carries the parent reels Bm to two rotary tables 259X, 259Y positioned side by side, each one substantially equivalent to the rotary table 259 of FIG. 7 and each one provided with a respective outfeed conveyor 261X, 261Y.

The anthropomorphic robot 263 can pick up the parent reels Bm, which have been upended and turned, from one or the other of the two outfeed conveyors 261X, 261Y to transfer them to selectively one or the other of the machines 1X and 1Y. The two machines 1X and 1Y can be substantially the same as each other and as the machine 1 described above.

To increase the range of action of the robot 263, it can be mounted on a slide or carriage 264 that can move in the direction f264 along tracks 266.

Many variations of the arrangements described herein can be envisaged.

For example, in some embodiments, the arrangement with two rotary tables 259X, 259Y may also be used to feed reels to a single machine 1. In additional embodiments a robot 263 may be used to pick up parent reels Bm from a single rotary table, in a manner similar to that illustrated in FIG. 7, but it may supply them, optionally moving on tracks 266, to two machines 1X, 1Y standing side by side.

In still further embodiments it can be foreseen that the same robot feeds more than two lines or machines 1, or that two robots be provided for a single line or machine 1.

In further embodiments a different spatial arrangement of the components illustrated in FIG. 7 or 13 may be provided to manipulate the parent reels Bm. For example, all the components may be arranged in a line. The robot 263 may be movably mounted on tracks parallel to the longitudinal extension of the machine 1, that is to say the direction of alignment of the various sections that form the machine. The robot may, for example, move from a rotary table 259 to an unwinding section 3 set at a greater distance from each other and in line, that is to say aligned in the alignment direction of the stations in machine 1.

The outfeed conveyors 261, 261X, 261Y may be omitted, if necessary using a robot 263 with a larger range of action, which can be obtained with a longer anthropomorphic arm 263A, or mounting the robot on a carriage or slide 264 as shown in FIG. 13.

FIG. 14 shows a plan view of a further embodiment of the arrangement for loading of the parent reels Bm onto the unwinding section 3 of the machine 1. In this embodiment an area 301 is provided for loading of pallets P, with parent reels Bm placed on them, onto a roller bed 303A, 303B or another suitable conveyor. The pallets P can be loaded using fork lift trucks or other suitable means, not shown here. From the conveyor 307B the reels are taken and turned by 90° by an upender indicated schematically with 306, to be placed with their axis horizontal on a second conveyor 307.

The empty pallets Pv can be removed from the conveyor 303A, 303B in a side area 305, from which they are then picked up, for example by a fork lift truck or other moving means.

The conveyor 307 extends from the upender 306, with functions similar to those of the upender 253, to a rotary table 309. This latter turns in the direction of the arrow f309 around a vertical axis, and has the same function as the rotary table 259 in the embodiment illustrated in FIG. 7.

The rotary table 309 can be associated with an outfeed conveyor 311, which moves each parent reel Bm from the rotary table 309 towards a loading robot 313, hereinafter indicated simply as robot. In certain embodiments the outfeed conveyor can be omitted and the loading robot 313 can be made to move towards and away from the rotary table 309 in a direction orthogonal to the direction of the second conveyor 307. In still further embodiments, the middle line of the components 303A, 303B, 307, 309 can be moved to align itself with the middle of machine 1, so that the outfeed conveyor 311 can be dispensed with. However, in certain embodiments the outfeed conveyor 311 may be particularly useful, as it acts as an intermediate buffer for one or more parent reels Bm.

In the embodiment of FIG. 14 the robot 313 is a simple device mounted on a carriage or slide moving along tracks 315, to move from the position illustrated with a solid line in FIG. 14 (in front of the rotary table 309) to one or the other of the two positions illustrated with a dotted line and marked 313A and 313B, aligned with one or the other of the unwinding mandrels 9 in the two unwinding stations 5 and 7.

The robot 313 may comprise a simple support or manipulator 317, optionally telescopic, mobile in the direction of the double arrow f317. The movements of the manipulator 317 and of the carriage or slide on which the robot 313 is mounted enable the parent reels Bm to be picked up from the outfeed conveyor 311 (or directly from the rotary table 309 if the outfeed conveyor 311 is not present) and to load the parent reels Bm on the unwinding mandrels 9. An ejector, not shown but which can be similar to the ejector 277, may facilitate transfer of the parent reels Bm from the manipulator 317 to the unwinding mandrel 9.

What we claim is:

1. A line for forming spools of web material, comprising:
   an unwinding section for unwinding parent reels of web material, comprising at least a first unwinding station and a second unwinding station, each unwinding station being provided with a respective unwinding mandrel;
   at least a winding station downstream of the unwinding section;
   a feed path from the unwinding section toward the winding station;
   wherein a loading arrangement of the parent reels in the unwinding section is associated with the unwinding section, and wherein the loading arrangement comprises: an upender configured to receive vertically oriented parent reels and to upend the vertically oriented parent reels positioning the vertically oriented parent reels with a horizontal orientation to form horizontally oriented parent reels; and a loading robot, configured to engage and pick up the horizontally oriented parent reels upended by the upender and position the parent reels on the unwinding mandrel of the first unwinding station and of the second unwinding station, selectively, wherein the loading arrangement comprises a rotary table, the rotary table being configured to receive horizontally oriented parent reels, the rotary table being further configured to rotate about a vertical axis to orient the parent reels in one or in another of two unwinding positions.

2. Line according to claim 1, further comprising a welding station for welding to each other a first web material coming from a first parent reel arranged in the first unwinding station and a second web material coming from a second parent reel arranged in the second unwinding station.

3. Line according to claim 2, comprising a plurality of winding stations positioned in sequence, and a cutting station arranged between the unwinding section and the winding stations, wherein the cutting station comprises cutting members to divide the web material coming from the unwinding section into longitudinal strips.

4. Line according to claim 2, wherein each winding station comprises a winding mandrel provided with a rotation movement about a rotation axis and with a translation movement in a direction parallel to the rotation axis, to form helically wound spools.

5. Line according to claim 2, wherein the loading robot comprises an anthropomorphic arm.

6. Line according to claim 1, comprising a plurality of winding stations positioned in sequence, and a cutting station arranged between the unwinding section and the winding stations, wherein the cutting station comprises cutting members to divide the web material coming from the unwinding section into longitudinal strips.

7. Line according to claim 1, wherein each winding station comprises a winding mandrel provided with a rotation movement about a rotation axis and with a translation movement in a direction parallel to the rotation axis, to form helically wound spools.

8. Line according to claim 1, wherein the loading robot comprises an anthropomorphic arm.

9. Line according to claim 1, wherein the loading robot comprises sensor members to detect the position of the tubular winding core of the parent reels.

10. Line according to claim 1, wherein the upender is arranged between a first conveyor, on which pallets of parent reels are loaded, on which the parent reels are positioned with their axis vertical, and a second conveyor, configured and arranged to receive from the upender the parent reels with their axis horizontal.

11. Line according to claim 1, wherein the upender is arranged between a first conveyor, on which pallets of parent reels are loaded, on which the parent reels are positioned with their axis vertical, and a second conveyor, configured and arranged to receive from the upender the parent reels with their axis horizontal, and wherein the second conveyor extends between the upender and the rotary table.

12. Line according to claim 1, wherein with the rotary table an output conveyor is associated, from which the parent reels are picked up by the loading robot.

13. Line according to claim 1, wherein the loading robot comprises a manipulator configured to be inserted into tubular winding cores of the parent reels and provided with an ejector to remove the parent reels from the manipulator and load them onto the unwinding mandrel of one or the other of said first unwinding station and second unwinding station.

14. Line according to claim 13, wherein the manipulator comprises an expandable shaft.

15. Line according to claim 14, wherein the ejector has a thrust plate approximately orthogonal to the longitudinal axis of the expandable shaft and equipped with two opposite recesses, one of the which allows sliding of the thrust plate along the expandable shaft and the other allows sliding of the thrust plate along the unwinding mandrel of the first unwinding station and of the second unwinding station, selectively, onto which the parent reel is loaded.

16. Line according to claim 13, wherein the manipulator comprises an expandable shaft, and wherein said ejector is movable parallel to the expandable shaft.

17. Line according to claim 16, wherein the expandable shaft houses moving members to move the ejector along the expandable shaft.

18. A line for forming spools of web material, comprising:
- an unwinding section for unwinding parent reels of web material, comprising at least a first unwinding station and a second unwinding station, each unwinding station being provided with a respective unwinding mandrel;
- at least a winding station downstream of the unwinding section;
- a feed path from the unwinding section toward the winding station;

wherein a loading arrangement of the parent reels in the unwinding section is associated with the unwinding section, and wherein the loading arrangement comprises: an upender configured to receive vertically oriented parent reels and to upend the vertically oriented parent reels positioning the vertically oriented parent reels with a horizontal orientation to form horizontally oriented parent reels; and a loading robot, configured to engage and pick up the horizontally oriented parent reels upended by the upender and position the parent reels on the unwinding mandrel of the first unwinding station and of the second unwinding station, selectively, wherein the upender is arranged between a first conveyor, on which pallets of parent reels are loaded, on which the parent reels are positioned with their axis vertical, and a second conveyor, configured and arranged to receive from the upender the parent reels with their axis horizontal.

19. A line for forming spools of web material, comprising:
- an unwinding section for unwinding parent reels of web material, comprising at least a first unwinding station and a second unwinding station, each unwinding station being provided with a respective unwinding mandrel;
- at least a winding station downstream of the unwinding section;
- a feed path from the unwinding section toward the winding station;

wherein a loading arrangement of the parent reels in the unwinding section is associated with the unwinding section, and wherein the loading arrangement comprises: an upender configured to receive vertically oriented parent reels and to upend the vertically oriented parent reels positioning the vertically oriented parent reels with a horizontal orientation to form horizontally oriented parent reels; and a loading robot, configured to engage and pick up the horizontally oriented parent reels upended by the upender and position the parent reels on the unwinding mandrel of the first unwinding station and of the second unwinding station, selectively, the loading robot comprising a manipulator configured to be inserted into tubular winding cores of the parent reels and provided with an ejector to remove the parent reels from the manipulator and load the parent reels onto the unwinding mandrel of one or the other of the first unwinding station and the second unwinding station, the manipulator comprising an expandable shaft, the ejector being movable parallel to the expandable shaft, wherein the expandable shaft houses moving members to move the ejector along the expandable shaft.

20. A line for forming spools of web material, comprising:
- an unwinding section for unwinding parent reels of web material, comprising at least a first unwinding station and a second unwinding station, each unwinding station being provided with a respective unwinding mandrel;
- at least a winding station downstream of the unwinding section;
- a feed path from the unwinding section toward the winding station;

wherein a loading arrangement of the parent reels in the unwinding section is associated with the unwinding section, and wherein the loading arrangement comprises: an upender configured to receive vertically oriented parent reels and to upend the vertically oriented parent reels positioning the vertically oriented parent reels with a horizontal orientation to form horizontally oriented parent reels; and a loading robot, configured to engage and pick up the horizontally oriented parent reels upended by the upender and position the parent reels on the unwinding mandrel of the first unwinding station and of the second unwinding station, selectively, wherein the loading robot comprises a manipulator configured to be inserted into tubular winding cores of the parent reels and provided with an ejector to remove the parent reels from the manipulator and load them onto the unwinding mandrel of one or the other of said first unwinding station and second unwinding station, the manipulator comprising an expandable shaft, the ejector having a thrust plate approximately orthogonal to the longitudinal axis of the expandable shaft and equipped with two opposite recesses, one of two opposite recesses allowing sliding of the thrust plate along the expandable shaft and the other one of the two opposite recesses allowing sliding of the thrust plate along the unwinding mandrel of the first unwinding station and of the second unwinding station, selectively, onto which the parent reel is loaded.

* * * * *